(12) United States Patent
Scott-Greavu (10) Patent No.: US 8,317,254 B2
(45) Date of Patent: Nov. 27, 2012

(54) TRAILER

(76) Inventor: Linda Scott-Greavu, Coopersville, MI (US)

( * ) Notice: Subject to any disclaimer, the term of this patent is extended or adjusted under 35 U.S.C. 154(b) by 568 days.

(21) Appl. No.: 12/501,540

(22) Filed: Jul. 13, 2009

(65) Prior Publication Data
US 2010/0066070 A1 Mar. 18, 2010

Related U.S. Application Data

(63) Continuation-in-part of application No. 11/518,619, filed on Sep. 11, 2006, now abandoned.

(60) Provisional application No. 60/729,386, filed on Oct. 24, 2005.

(51) Int. Cl.
*B60P 3/35* (2006.01)

(52) U.S. Cl. .................. 296/168; 296/26.04; 280/415.1

(58) Field of Classification Search .................. 296/156, 296/168, 173, 174, 24.45, 26.04, 37.6, 37.14; 280/415.1
See application file for complete search history.

(56) References Cited

U.S. PATENT DOCUMENTS

| | | | | |
|---|---|---|---|---|
| 1,422,498 A * | 7/1922 | Vint | 296/172 |
| 3,667,799 A * | 6/1972 | Shryock | 296/168 |
| 3,705,743 A * | 12/1972 | Toomey | 296/168 |
| 4,511,174 A * | 4/1985 | Walker | 296/173 |
| 4,637,647 A * | 1/1987 | Bunting et al. | 296/24.45 |
| 5,383,703 A * | 1/1995 | Irvine, III | 296/24.45 |
| 5,509,709 A * | 4/1996 | Carroll | 296/3 |
| 6,283,537 B1 * | 9/2001 | DeVore, III | 296/182.1 |
| 6,416,101 B1 * | 7/2002 | Bartch | 296/22 |
| 6,817,653 B2 * | 11/2004 | Ropp | 296/186.2 |
| 2002/0153747 A1 * | 10/2002 | Ropp | 296/181 |
| 2005/0225116 A1 * | 10/2005 | Fisher et al. | 296/168 |
| 2005/0253417 A1 * | 11/2005 | Cundy | 296/168 |
| 2006/0043768 A1 * | 3/2006 | Ray | 296/173 |
| 2006/0208454 A1 * | 9/2006 | Giesler | 280/415.1 |
| 2010/0133873 A1 * | 6/2010 | Carlton | 296/168 |
| 2010/0314898 A1 * | 12/2010 | Hawkinson | 296/37.6 |

* cited by examiner

*Primary Examiner* — Jason S Morrow
(74) *Attorney, Agent, or Firm* — Robert J. Sayfie (57) ABSTRACT

A trailer that has doors and openings to hold and transport items, and can convert to a flatbed trailer with a trunk door, a flatbed front, and flatbed sides.

4 Claims, 8 Drawing Sheets

TRAILER

This Application is a continuation in part of U.S. patent application Ser. No. 11/518,619 filed 11 Sep. 2006, now abandoned as of the filing of this CIP application, which claims priority from a provisional patent application No. 60/729,386, filed on 24 Oct. 2005, which documents are incorporated herein in their entirety by this reference thereto.

GOVERNMENT RIGHTS

This invention was not made with Government support under. The Government does not have any rights in this invention.

BACKGROUND OF THE INVENTION

Trailers may be used to load, unload thing, store, and transport items and goods. For example, a loading device may be used to assist in loading motorcycles onto the beds of pickup trucks.

U.S. Pat. No. 3,492,042 ("the '042 patent") illustrates a "vehicle body." The abstract discloses "A two-wheeled camping trailer convertible into a general utility trailer." However, the 042 patent is not convertible to a flatbed trailer with upstanding walls. The '042 patent does not have a lower opening, or a back side opening. The '042 patent is lower than typical shelf height. The '042 patent discloses the lowest portion, the frame 16 as having a cut-out for the tires, which limits its flatbed space usage.

As can be seen, there is a need for a trailer that can be used to store and transport camping supplies, and be converted into a flatbed trailer. There is a need for a trailer that can have access to storage compartments, whereby the access can be from the rear, front, sides, or top.

There is also a need to have a spare tire on the trailer.

There is also a need to lock the trailer doors or access means.

SUMMARY OF THE INVENTION

One aspect of the present invention is a trailer (10), comprising: a platform (20) being rollably supported by a displacement means (30); a flatbed assembly (370) disposed on said platform (20).

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for illustrating the general principles of the invention, since the scope of the invention is best defined by the appended claims.

Figure 1:
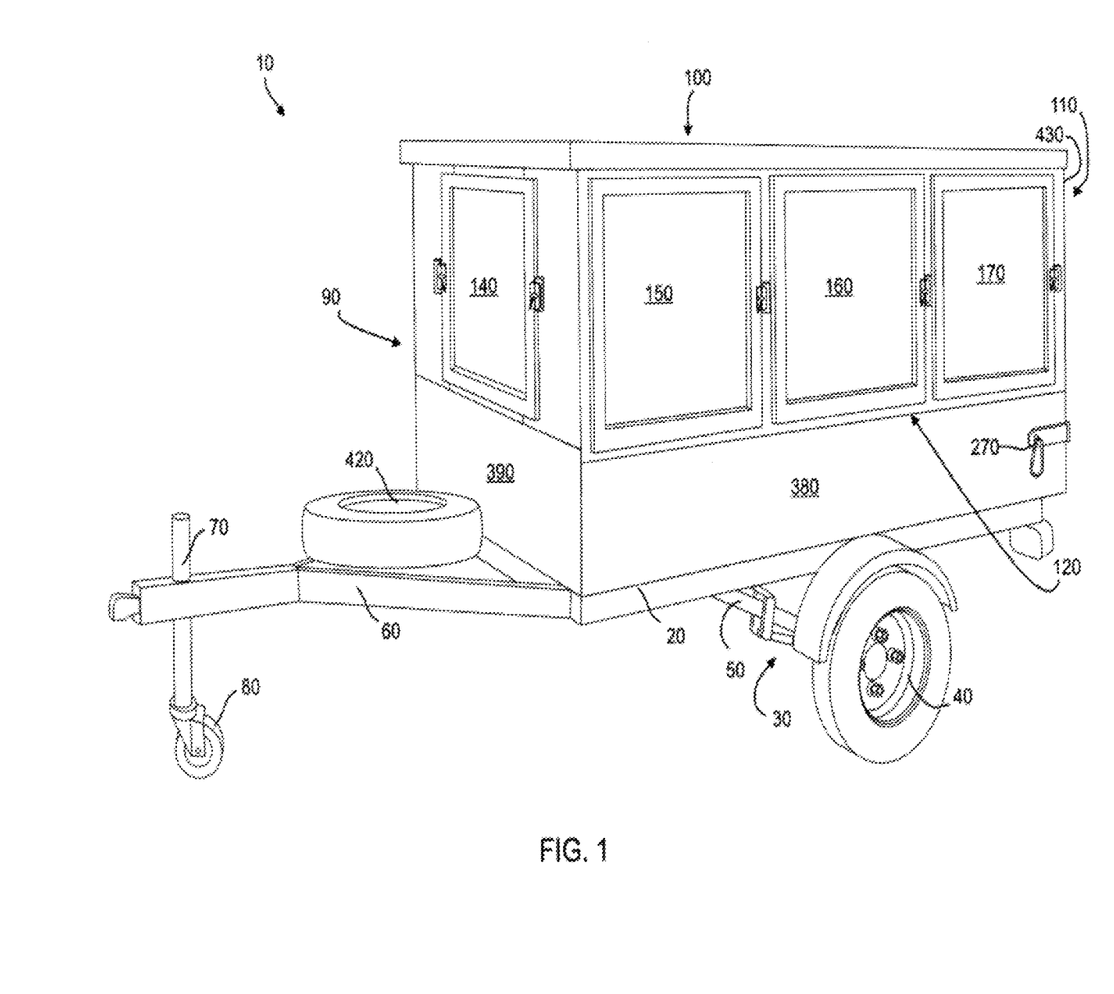
FIG. 1 is a pictorial view of a front and left side of an embodiment of the trailer.
Figure 7:
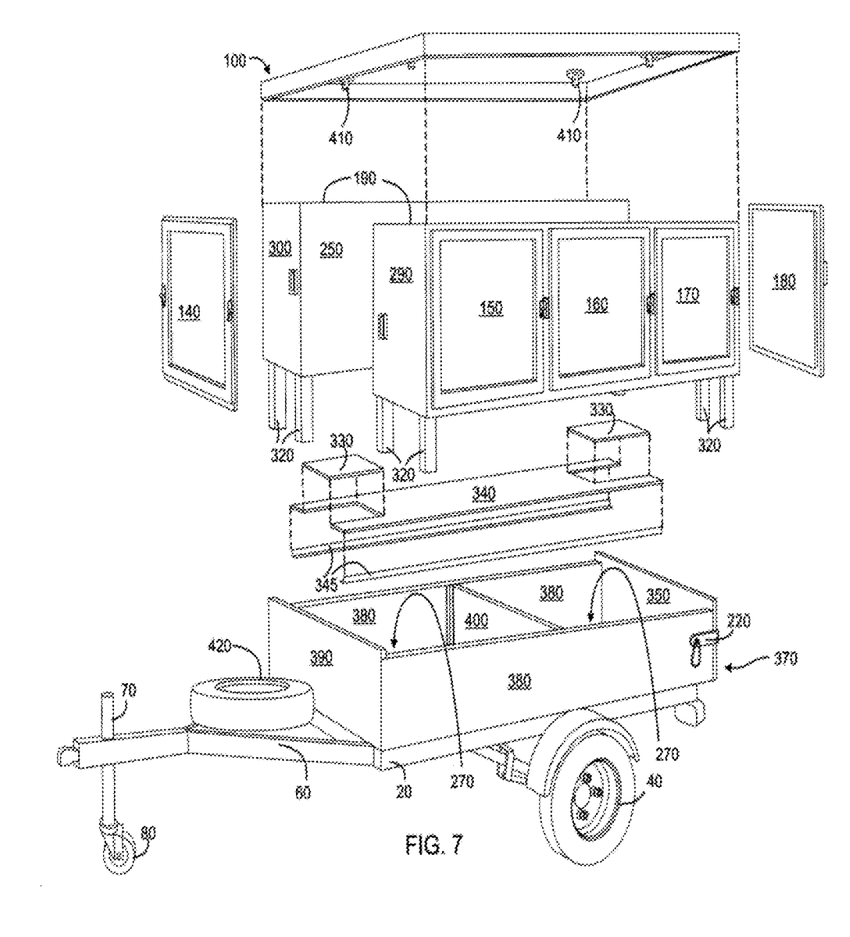
FIG. 7 is a pictorial view of how the present invention may be assembled or disassembled.

REFERENCE NUMERALS 10 trailer
20 platform
30 displacement means
40 wheel
50 axle
60 tongue
70 hitch
80 hitch wheel and caster assembly
90 front side
100 top side
110 back side
120 left side
130 right side
140 front door
150 first left side door
160 second left side door
170 third left side door
180 back door
190 first right side door
200 second right side door
210 third right side door
220 latch lock
230 support receiver
240 support
250 opening
260 shelf
270 hinge
280 door lock
290 back side first door
300 back side second door
310 back side opening
320 column
330 removable panel
340 slider
350 trunk door
360 short slider
370 flatbed assembly
380 flatbed side
390 flatbed front
400 divider
410 removable securement means
420 tire holder
430 cubicle shaped frame
440 upstanding wall
450 lower opening
460 flatbed bottom
470 handle FIG. 1 illustrates an embodiment of a trailer 10 of the present invention 10. The trailer 10 may have a trailer frame 20 or platform 20 having a tongue 60 extending forwardly therefrom. The tongue 60 may have a hitch 70 extending upwardly therefrom so that the trailer 10 can attach to a motor vehicle. A hitch wheel and caster assembly 80 may extend downwardly from the tongue 60. The tongue 60 may have a tire holder 420 on the tongue 60. The platform 20 may support a flatbed side 380 or two flatbed sides 380, a flatbed front 390, and a rear door 350, as illustrated in FIG. 7. The flatbed assembly 370 may have a divider 400 that can removed or installed, if one or two openings 250 are desired.

In one embodiment of the trailer 10, above the flatbed side 380 may be a cubicle shaped frame 430, having a first left side door 150, a second left side door 160, and a third left side door 170. Each door 150, 160, and 170 may be hingedly connected to the cubicle shaped frame 430. The doors 150, 160, and 170 may be opened to access an opening 250. A shelf 260 may be removably disposed within the opening 250. The shelf 260 may be secured or removably secured to an upstanding wall 430.

The front side 90 may have a flatbed front 390, and a front door 140 hingedly secured to the cubicle shaped frame 430, also referred to herein as a frame 430.

As illustrated in FIG. 1, one embodiment of the trailer 10 may have the platform 20 supported by an axle 50 and wheel 40 that is rotatably fixed to the axle 50

Figure 2:
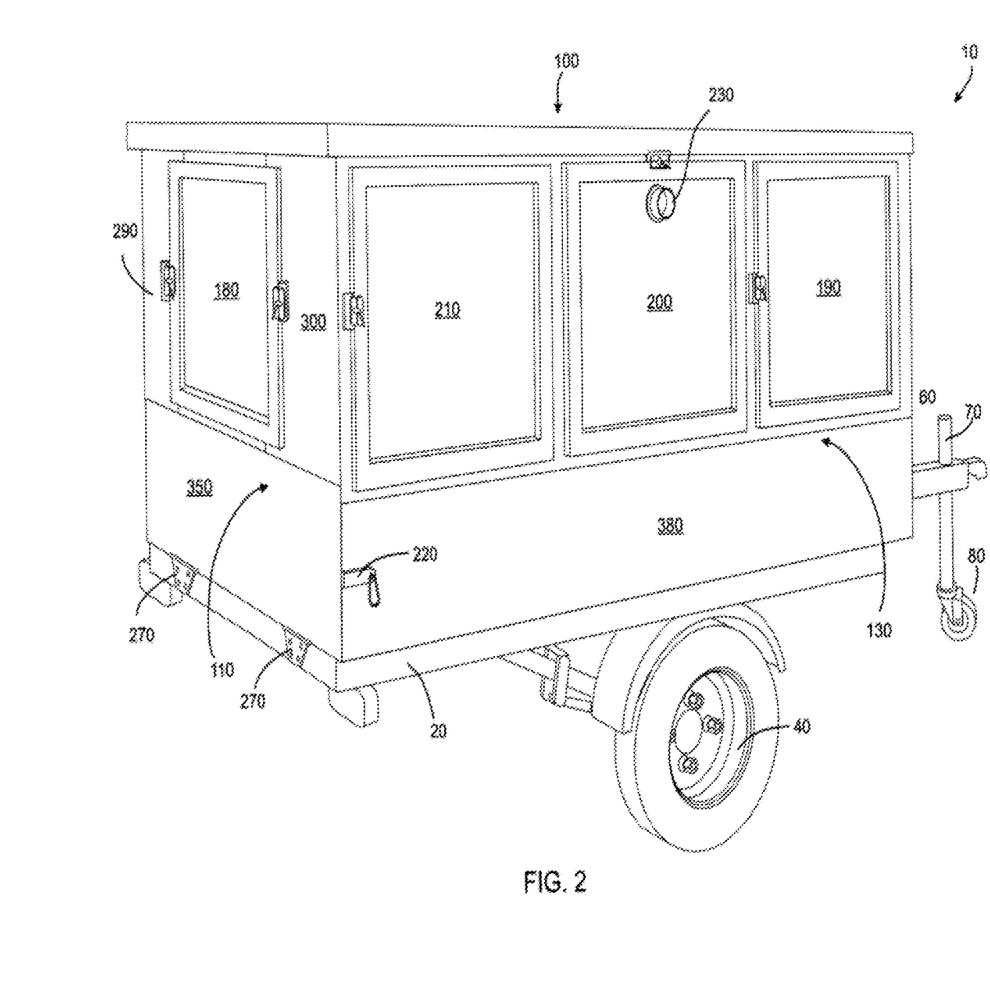
FIG. 2 is a pictorial view of a rear or back and right side of an embodiment of the trailer.

FIG. 2 illustrates a pictorial of an embodiment of the trailer 10, having a right side 130. The right side 130 may have a flatbed side 380 and above the flatbed side 380, the trailer 10 may have a first right side door 190, a second right side door 200, and a third right side door 210. The rear side 110 may have a rear door 180, which may be hingedly connected to the frame 430. platform 20. A trunk door 350 may be hingedly connected to the platform 20 via a hinge 270.

Figure 3:
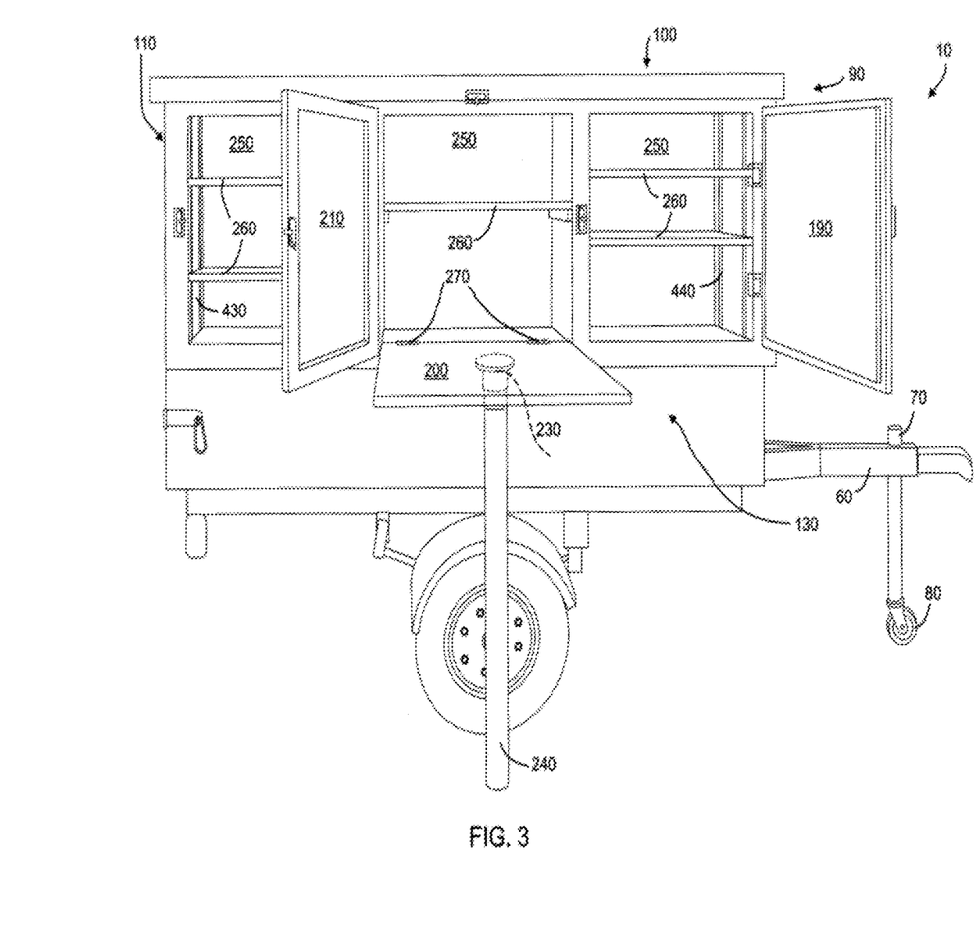
FIG. 3 is a pictorial view of the right side of an embodiment of the present invention.

FIG. 3 illustrates one embodiment of the present invention 10 having a second right side door 200 that may fold downwardly via a hinge 270 that may be connected to the frame 430. When the second right side door 200 is opened and folded downwardly, it 200 may be supported by a support 240 that fits into a support receiver 230 secured on the second right side door 200. The receiver 230 is also illustrated in FIG. 2.

Figure 4:
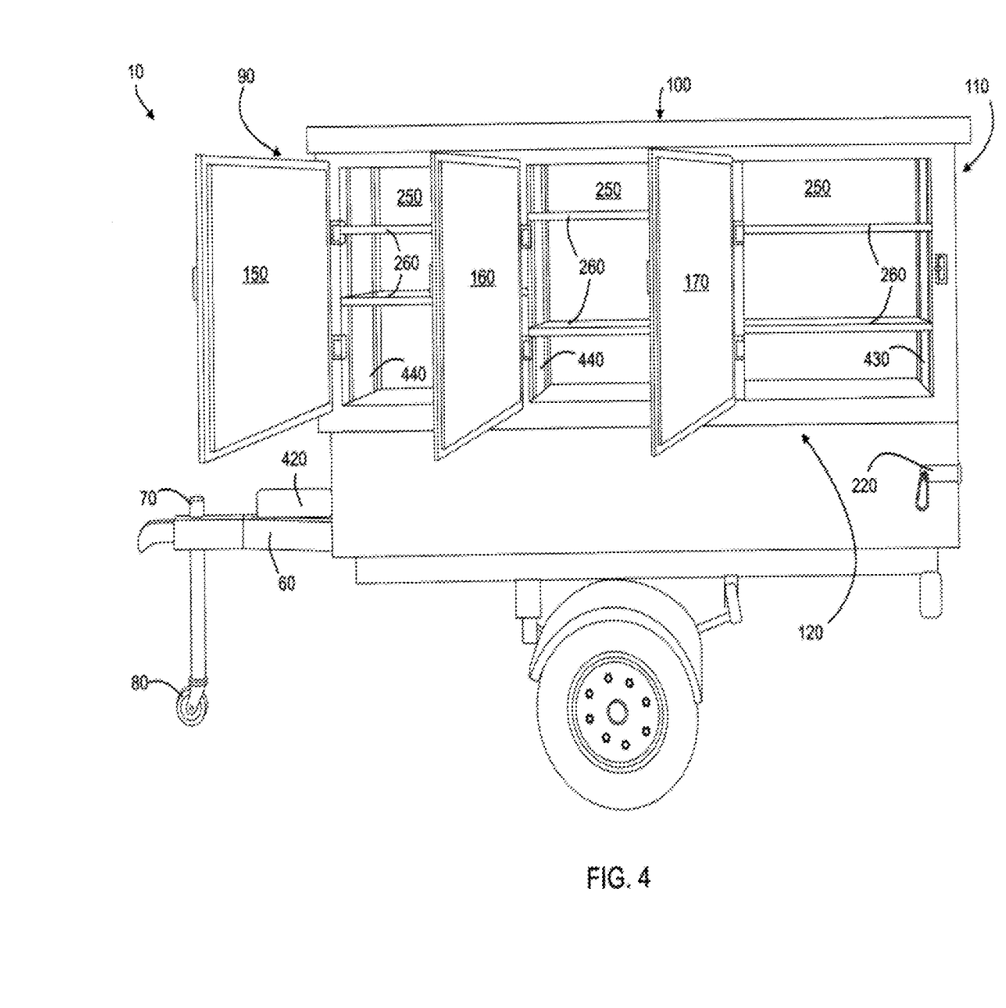
FIG. 4 is pictorial of an embodiment of the left side of the present invention.

FIG. 4 illustrates the left side 120 of the trailer 10. The left side 120 may have a flatbed side 380 secured to the platform 20. Above the flatbed side 380 may be a first left side door 150, and to the right of the first left side door may be a second left side door 160, and to the right of the second left side door 160 may be a third left side door 170. Each door 150, 160, 170 may be hingedly connected to the cubicle frame 430 via a hinge 270. A shelf 260 may be secured to an upstanding wall 440 of the frame 430, to define an opening 250 within the doors 150, 160, 170.

Figure 5:
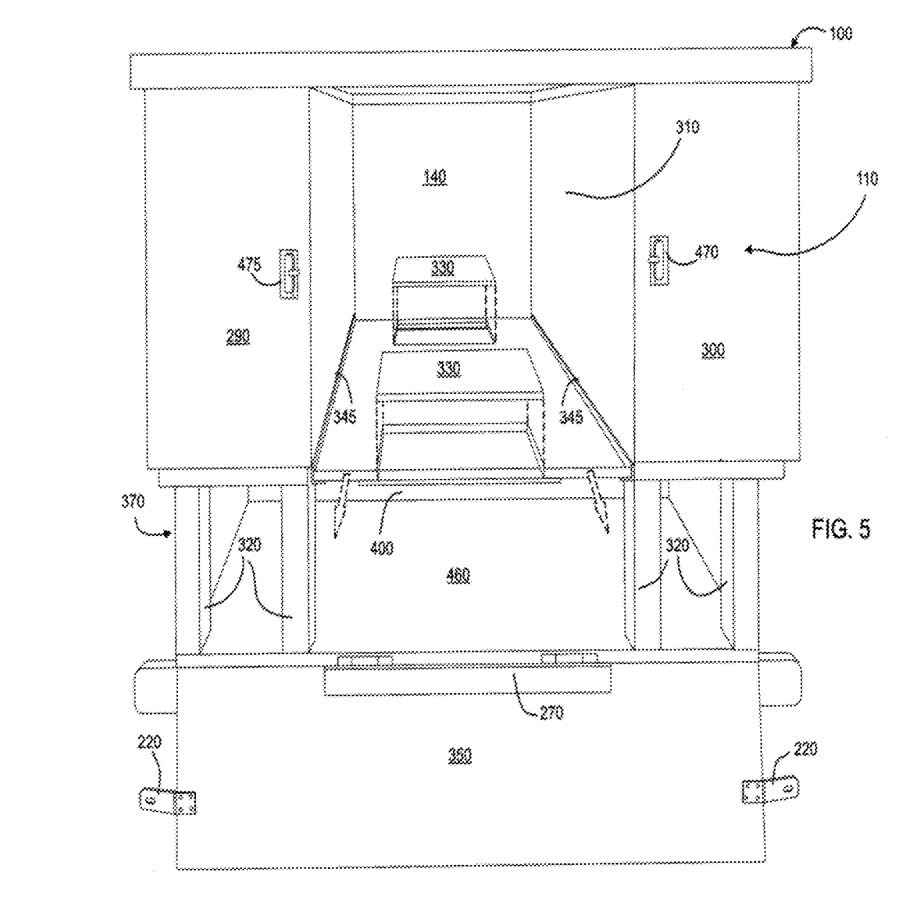
FIG. 5 is a rear view pictorial of the present invention.

FIG. 5 illustrates a back side 110 of one embodiment of the trailer 10 of the present invention 10. The back side 110 may have a trunk door 350 that may be hingedly connected to the platform 20, so that the trunk door 350 folds downwardly. The frame 430 may have columns 320 that support the frame 430 within the flatbed assembly 370. Above the columns 370 may be a back side first door 290, and to the right of the back side first door 290 may be a back side second door 300. In one embodiment of the present invention 10 the back side second door 300 may be disposed at a distance to the right of the back side first door 290, and a slider 340 may be slidably disposed to the frame 430 at the so as to define a back side opening 310 between the back side first door 290, back side second door 300, and the slider 340. The slider 340 may be disposed upwardly from a flatbed bottom 460 to define a lower opening 460. The slider 340 may have a removable panel 330. In one embodiment the removable panel 330 may be disposed at a rear end of the slider 340. In one embodiment the removable panel 330 may be disposed at a front end of the slider 340. In one embodiment of the present invention 10 a removable panel 330 may be disposed at each end of the slider 340, so that there are two removable panels 330. The trunk door 350 may have a door lock 280 on it so that it can lock in place to the flatbed side 380. Each door 290, 300 may have a handle 470 or latch lock 220.

Figure 6:
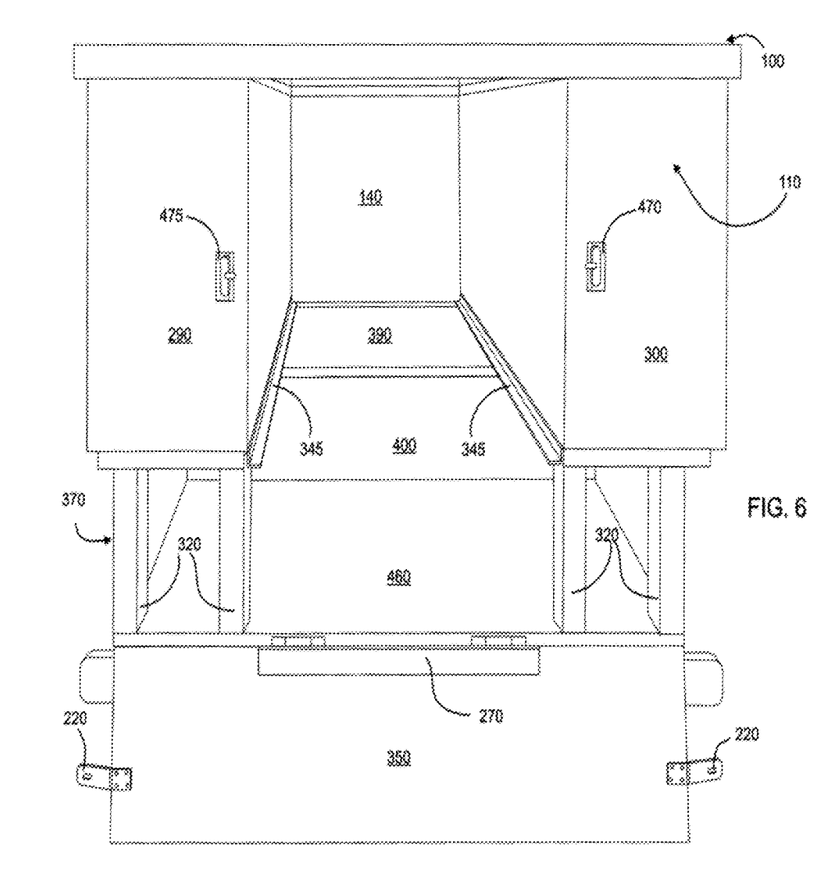
FIG. 6 is another rear view pictorial of an embodiment of the present invention.

FIG. 6 illustrates a back side 100 of the present invention 10 having a short slider 360 slidable disposed to the frame 430 near the lower end of, and to the right of the back side first door 290 and near the lower end of, and to the left of the back side second door 300.

FIG. 7 illustrates how parts of the trailer 10 may be disassembled or removed to form a flatbed assembly 370, having a flatbed front 390 disposed to the front of the platform, a trunk door 350 hingedly disposed on the platform 20 near the rear, two opposed flatbed sides 380 secured to the platform to define an opening 250. A divider may be disposed between said flatbed front 390 and the trunk door 350 so as to define two openings 250.

Figures 8, 9:
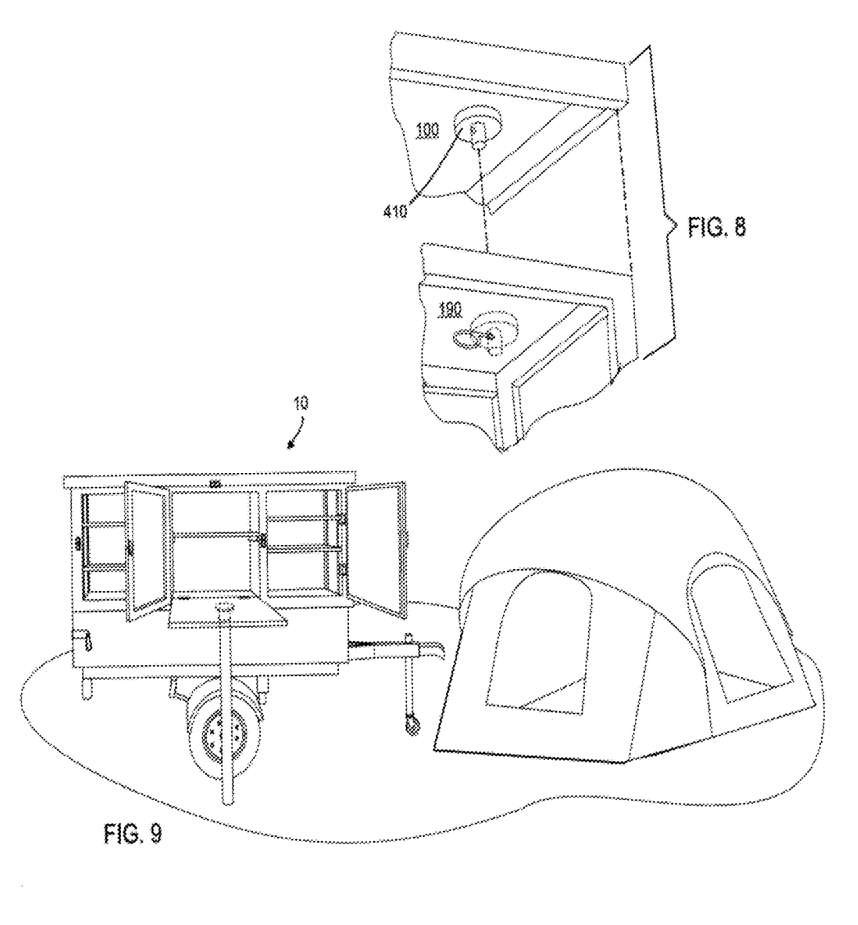
FIG. 8 is a pictorial of a securement means of the present invention.
FIG. 9 is a pictorial of the present invention in a camping setting.

FIG. 8 illustrates one embodiment as to how the components of the trailer 10 may be removable secured by a removable securement means 410. For example, the lower end of the columns 320 may be removably secured to the flatbed bottom 460 via the removable securement means 410. In one embodiment of the present invention 10, the removable securement means may be a locking pin assembly, or cotter pin. In addition, the top side 100 may be removably secured to the frame 430 via the removable securement means 410. Other components may also be removably secured to each other by the same manner or structure.

FIG. 10 illustrates one embodiment of the use of the present invention 10 in a camping setting.

The trailer 10 may be made of wood, plastic, metal, or other materials with similar properties.

It should be understood, of course, that the foregoing relates to exemplary embodiments of the invention and that modifications may be made without departing from the spirit and scope of the invention as set forth in the following claims.

I claim:

1. A trailer (10), comprising:
a platform (20) being rollably supported by a displacement means (30);
a flatbed assembly (370) disposed on said platform (20);
a frame (430) disposed on said flatbed assembly (370); and
said frame being supported by a plurality of columns (320)
wherein said frame (430) has a front (90), a back (110) disposed rearwardly from said front (90), a left side (120) disposed substantially perpendicular to said front (90), a right side (130) disposed rightwardly from said left side (120),
said front (90) has a front door (140);
said left side (120) has a first left side door (150) hingedly disposed thereon via a hinge (270), a second left side door (160) disposed rightwardly from said first left side door (150), and a third left side door (170) disposed rightwardly from said second left side door (160), each door (150), (160), (170) is hingedly connected to said frame (430) so that each door (150), (160), (170), may be opened or closed, and each door (150), (160), (170), has a latch lock (220) so that each door (150), (160), (170) may be locked shut;
said right side (130) has a first right side door (190) hingedly disposed thereon via a hinge (270), a second right side door (200) disposed rightwardly from said first right side door (190), and a third right side door (210) disposed rightwardly from said second right side door (200), each door (190), (200), (210) is hingedly connected to said frame (430) so that each door (190), (200), (210), may be opened or closed, and each door (190), (200), (210), has a latch lock (220) so that each door (190), (200), (210) may be locked shut; and said back side (110) having a trunk door (350) hingedly connected to at least one of said platform (20) or a flatbed bottom of said flatbed assembly (370) so that said trunk door (350) can fold downwardly to an open position; said frame (430) being supported by said columns (320), so that said flatbed bottom (460), two opposed flatbed sides (380), said flatbed front (390), and said frame (430) define a lower opening (460).

2. The trailer (1) of claim 1, further comprising:

a slider (340) slidably disposed between a back side first door (290) and a back side second door (300) rightwardly from said back side first door. (290).

3. The trailer (1) of claim 1, wherein said columns (320) are removably secured to said flatbed bottom (460), said top (100) is removably secured to said left side (120) and said right side (130), said front door (140) is removably secured to said left side (120) and said right side (130), and said back door (180) is removably secured to said left side (120) and said right side (130), wherein said trailer (10) can convert to a flatbed assembly (370).

4. A trailer, comprising:

a platform (20) being rollably supported by a displacement means (30);

a flatbed assembly (370) disposed on said platform (20);

a frame (430) disposed on said flatbed assembly (370);

said frame being supported by a plurality of columns (320);

wherein said flatbed assembly (370) has a flatbed bottom (460) disposed on said platform (20), a flatbed front (390) secured to said flatbed bottom (460), two opposed flatbed sides (380) disposed substantially perpendicular to said flatbed front (390) and secured to said flatbed bottom (460), and a trunk door (350) disposed rearwardly of said flatbed front (390) and hingedly secured to said flatbed bottom (460), wherein said flatbed bottom (460), said flatbed front (390), said opposed flatbed sides (380) and said trunk door (350) define an opening (250)

wherein said frame (430) has a front (90), a back (110) disposed rearwardly from said front (90), a left side (120) disposed substantially perpendicular to said front (90), a right side (130) disposed rightwardly from said left side (120), said front (90) has a front door (140);

said left side (120) has a first left side door (150) hingedly disposed thereon via a hinge (270), a second left side door (160) disposed rightwardly from said first left side door (150), and a third left side door (170) disposed rightwardly from said second left side door (160), each door (150), (160), (170) is hingedly connected to said frame (430) so that each door (150), (160), (170), may be opened or closed, and each door (150), (160), (170), has a latch lock (220) so that each door (150), (160), (170) may be locked shut;

said right side (130) has a first right side door (190) hingedly disposed thereon via a hinge (270), a second right side door (200) disposed rightwardly from said first right side door (190), and a third right side door (210) disposed rightwardly from said second right side door (200) each door (190), (200), (210) is hingedly connected to said frame (430) so that each door (190), (200), (210), may be opened or closed, and each door (190), (200), (210), has a latch lock (220) so that each door (190), (200), (210) may be locked shut;

said back side (110) having a trunk door (350) hingedly connected to at least one of said platform (20) or a flatbed bottom of said flatbed assembly (370) so that said trunk door (350) can fold downwardly to an open position; said frame (430) being supported by a plurality of columns (320), so that said flatbed bottom (460), two opposed flatbed sides (380), said flatbed front (390), and said frame (430) define a lower opening (460); and said frame being supported by a said plurality of columns (320), and the trailer can be assembled and disassembled.

* * * * *